(12) United States Patent
Yowanto et al.

(10) Patent No.: US 12,523,631 B2
(45) Date of Patent: Jan. 13, 2026

(54) GENOME INTEGRITY ANALYSIS OF ADENO-ASSOCIATED VIRUS VECTORS

(71) Applicant: DH TECHNOLOGIES DEVELOPMENT PTE. LTD., Singapore (SG)

(72) Inventors: Handy Yowanto, Walnut, CA (US); Elliot B. Jones, Redwood City, CA (US); Jane Luo, Brea, CA (US)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 664 days.

(21) Appl. No.: 17/916,647

(22) PCT Filed: Apr. 6, 2021

(86) PCT No.: PCT/IB2021/052863
§ 371 (c)(1),
(2) Date: Oct. 3, 2022

(87) PCT Pub. No.: WO2021/205348
PCT Pub. Date: Oct. 14, 2021

(65) Prior Publication Data
US 2023/0132528 A1 May 4, 2023

Related U.S. Application Data

(60) Provisional application No. 63/006,012, filed on Apr. 6, 2020.

(51) Int. Cl.
*G01N 27/447* (2006.01)
*C12N 9/22* (2006.01)
*C12N 9/50* (2006.01)
*C12N 15/10* (2006.01)
*C12Q 1/70* (2006.01)

(52) U.S. Cl.
CPC ......... *G01N 27/44721* (2013.01); *C12N 9/22* (2013.01); *C12N 9/50* (2013.01); *C12N 15/101* (2013.01); *C12Q 1/70* (2013.01); *G01N 27/44782* (2013.01); *C12N 2750/14141* (2013.01); *C12Y 304/21064* (2013.01)

(58) Field of Classification Search
CPC ................ G01N 27/44721; C12N 2750/14141
See application file for complete search history.

(56) References Cited

PUBLICATIONS

PCT, International Search Report regarding Application No. PCT/IB2021/053863, 11 pages, mailed Aug. 16, 2021.
(Continued)

*Primary Examiner* — Jeffrey S Parkin
(74) *Attorney, Agent, or Firm* — Lathrop GPM LLP; Malaika O.D. Tyson; Jason Kuchar

(57) ABSTRACT

A CE based method and kit for the determination of the size and purity of an AAV genome which relies on Capillary Electrophoresis-Laser Induced Fluorescence (CE-LIF) analysis. These methods and kits are capable of detecting intact and partial genomes in a virus vectors such as adeno-associated viruses as well as remove small size impurities. In one example, the method can include creating a nucleic acid ladder using CE-LIF, releasing the genome from within an adeno-associated virus, purifying said genome and analyzing said genome using CE-LIF and comparing the results of the analysis of the genome to the nucleic acid ladder to determine a size of nucleic acids in the genome.

12 Claims, 13 Drawing Sheets

(56) References Cited

PUBLICATIONS

Li, Tingting, et al., "Characterization of Adeno-Associated Virus (AAV) using Capillary Electrophoresis," PEGS Europe 2019, 1 page, dated Nov. 18, 2019.

Xiaotong, Fu, et al., "Analytical Strategies for Quantification of Adeno-Associated Virus Empty Capsids to Support Process Development," Human Gene Therapy Methods, vol. 30, No. 4, 9 pages, dated Aug. 1, 2019.

Lock, Martin, et al., "Absolute Determination of Single-Stranded and Self-Complemen tary Adeno-Associated Viral Vector Genome Titers by Droplet Digitakl PCR", Human Gene Therapy Methods, vol. 25, No. 2, 11 pages, dated Apr. 1, 2014.

Schnodt, Maria, et al., "Improving the Quality of Adeno-Associated Viral Vector Preparations: The Challenge of Product-Related Impurities," Human Gene Therapy Methods, vol. 28, No. 3, 8 pages, dated 0-01-2017.

Kaneta, Takashi, "Laser-Induced Fluorometry for Capillary Electrophoresis," Chemical Record, vol. 19, Nos. 2-3, 10 pages, dated Aug. 6, 2018.

Li, Tingting, et al., "Rapid Determination of Full and Empty Adeno-Associated Virus Capsid Ratio by Capillary Isoelectric Focusing," Current Molecular Medicine, vol. 20., No. 10, 7 pages, dated Feb. 3, 2021.

GENOME INTEGRITY ANALYSIS OF ADENO-ASSOCIATED VIRUS VECTORS

RELATED APPLICATIONS

The present application is filed pursuant to 35 U.S.C. 371 as a U.S. National Phase application of International Patent Application No. PCT/IB2021/052863, which was filed Apr. 6, 2021, claiming the benefit of priority from U.S. Provisional Application Ser. No. 63/006,012, filed on Apr. 6, 2020. The entire text of the aforementioned applications is incorporated herein by reference in its entirety.

FIELD

The within teachings relate to genome integrity analysis

BACKGROUND

Adeno-associated virus (AAV) is a small (25-nm) virus that is composed of a non-enveloped icosahedral protein shell known as a capsid and a single-stranded DNA genome of length of about 4.7 kb. With its excellent safety profile and high efficiency in transducing a broad range of target tissues, AAV vectors have become an attractive choice for gene therapy. Recombinant AAV (rAAV) based drugs and therapies have been approved by FDA and many are in clinical trials. One of the most commonly used methods for the production of rAAV vectors is the triple-transfection method that involves co-transfection of permissive cells such as HEK293 cells with three plasmids: one containing the transgene of interest flanked by the AAV inverted terminal repeats (ITRs), a packaging plasmid containing rep and cap genes, and a third plasmid encoding adenoviral helper genes. Gradient ultra-centrifugation is often used for purification of packaged rAAV vectors (Full capsids) from cellular debris contaminants, host cell DNA and RNA as well as Empty AAV capsids. However, remnants of contaminants can still be present in the viral vector product after purification. In addition, errors made in genome encapsidation in rAAV production can lead to heterogeneous populations with both intact genome and partial or smaller than unit-length genomes. The quality of Full capsids has a direct impact on the efficacy of the treatment including outcome of both preclinical and clinical studies. Therefore, it is crucial to accurately assess the quality and the correct length/size of the genome encapsulated in the vector. Verification of genome size has been traditionally done by denaturing agarose-gel electrophoresis and southern blot. Both these methods are time consuming and with limited resolution on size determination.

There is therefore a need for an improved method to determine the size and purity of an AAV genome.

SUMMARY

In accordance with various aspects of the present teachings, a capillary electrophoresis based method and kit for the determination of the size and purity of an AAV genome is described. These methods are capable of detecting intact and partial genomes in a virus vector as well as remove small size impurities.

In various embodiments, a method for analyzing a genome of an adeno-associated virus in a sample comprising: creating a standard comprising a number of different nucleic acid strands, each of the different nucleic acid strands having a known size; creating a size ladder of said nucleic acid strands utilizing CE-LIF; subjecting said sample to purification (optionally utilizing a QIAquick PCR purification kit); analyzing said purified sample using CE-LIF; and comparing the analysis of the purified sample to the size ladder and identifying the size of a genome in said sample.

In various embodiments, the method can further comprise prior to subjecting said sample to purification utilizing a QIAquick PCR purification kit, treating said sample with benzonase and filtering said treated sample to remove degraded impurities.

In some embodiments, the nucleic acid strands utilized to make the standards are RNA.

In various embodiments, a kit is provided for analyzing an adeno-associated virus, the kit comprises a number of different nucleic acid strands, each strand having a known and different size and benzonase.

In accordance with various aspects of the present teachings, a method for analyzing a genome of an adeno-associated virus in a sample is described, the method comprising: creating a standard comprising a number of different nucleic acid strands, each of the different nucleic acid strands having a known size; separating each of the different nucleic acid strands in the standard by measuring each of the nucleic acid strands having a known size by utilizing a capillary electrophoresis-laser induced fluorescence (CE-LIF) device and measuring the separated nucleic acid strands as intensity peaks that are a function of migration time using a detector of the CE-LIF; creating a purified sample by subjecting said sample to purification to remove nucleic acid impurities; releasing nucleic acid material from the adeno-associated virus in the purified sample by use of an enzyme; separating and analyzing the released nucleic acid material from the purified sample utilizing the CE-LIF device and measuring the separated nucleic acid strands as one or more intensity peaks that are a function of migration time using a detector of the CE-LIF; and identifying the size of the nucleic acid material in the sample by comparing the intensities and migration times of the released nucleic acid material from the purified sample and the intensities and migration times of the nucleic acid strands of the standard.

In various embodiments, the nucleic acid strands of the standard comprise RNA. In various embodiments, purification of the samples is performed by digesting the sample with benzonase and isolating the adeno-associated virus by filtration. In various embodiments, the enzyme is Proteinase K. In various embodiments, the released nucleic acid material is subjected to purification using a PCR purification kit. In various embodiments, the nucleic acid material comprises DNA.

In various embodiments, a kit for analyzing an adeno-associated virus is described, the kit comprising: a standard comprising a plurality of different RNA strands, each of the different RNA strands strand having a known and different size; a positive control containing an intact AAV genome, a partial AAV genome and small size impurities; a separation matrix adapted for use with capillary electrophoresis.

In various embodiments, the kit further comprising enzymes to digest nucleic acids. In various the enzymes comprises benzonase. In various embodiments, the kit further comprises an enzyme that releases nucleic acid from an adeno-associated virus. In various embodiments, the enzyme is Proteinase K. In various embodiments, the kit further comprises materials adapted to perform a PCR purification.

DETAILED DESCRIPTION

Figure 1:
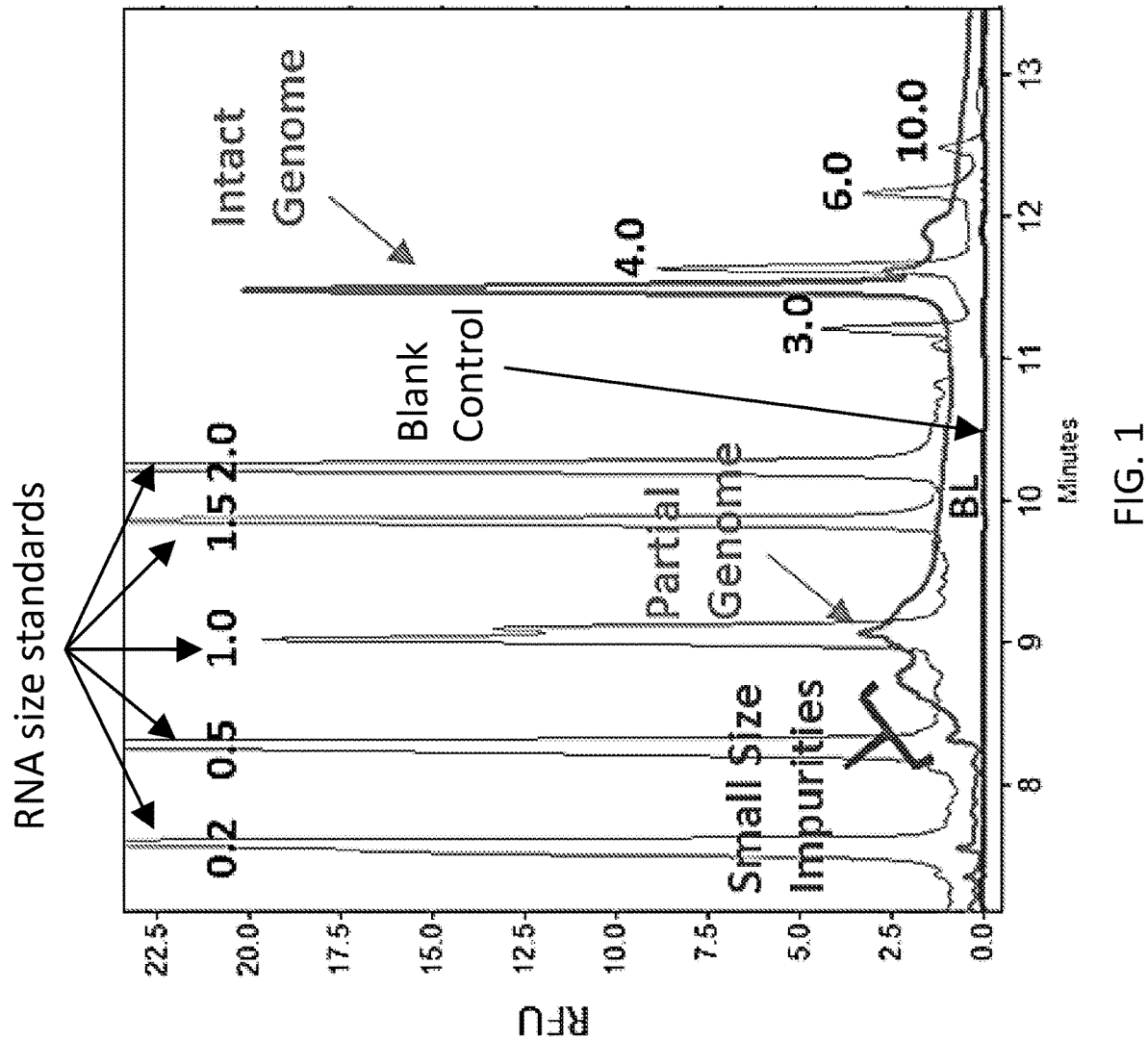
FIG. 1 depicts a genome size analysis of an AAV8 sample.

The present teachings pertain to methods and analyses of virus vectors and in particular adeno-associated viruses that determine the size and purity of AAV genomes.

Materials: The LIF Performance Test Mix (PN: 726022), Nano vials (PN 5043467) and pre-assembled EZ-CE Capillary Cartridge (PN A55625,) were from SCIEX, Framingham, MA. Urea (PN 29700), Nuclease free water (PN AM9932), SYBR Green II RNA gel stain, 10,000× concentrate in DMSO (PN S7564), 10× DNase I buffer (PN AM8170G) were obtained from Thermo Fisher Scientific, Waltham, MA. Polyvinyl-pyrrolidone (PVP, PN 437190), benzonase (PN E1014-5KU), 0.5 M EDTA, pH 8.0 (PN E7889-100ML), Transcript RNA markers 0.2-10 kb (PN R7020) and 10× Tris Borate EDTA (TBE) buffer (PN 574795), Molecular Biology Grade, Amicon Ultra-0.5 centrifugal filter unit with MW cut off of 100 KDa (PN UFC510024) were from Millipore Sigma, St. Louis, MO. The 5 μm syringe filter (PN 4650) was from PALL Corporation, Port Washington, NY. Rainin LTS filter tips were from Mettler Toledo, Oakland, CA. QIAquick PCR purification Kit (PN 28104) and Proteinase K (PN 19131) were from Qiagen, Germantown, MD. Packaged AAV8 and AAV formulation buffer (1×PBS with 0.001% Pluronic F68) were from Vigene Biosciences, Rockville, MD. AAV5 and AAV2 were from Signagen, Rockville, MD.

The materials used includes the following obtained from the QIAquick purification kit: a spin column (silicon based column), buffer PB (binding buffer with salt in high concentration containing a high concentration of guanidine hydrochloride), Buffer PE (Concentrated wash buffer containing high salt concentration and 75% ethanol) and collection tubes. In place of utilizing this kit, the components can be obtained or made individually using generic materials to replicate the contents of the kit.

Instrument and software: A PA 800 Plus Pharmaceutical Analysis System equipped with Laser Induced Fluorescene (LIF) detector and solid-state laser with excitation wavelength at 488 nm and a 520 nm band pass emission filter were from SCIEX, Framingham, MA. Data acquisition and analysis were performed using 32 Karat software V10.3.

Preparation of the separation buffer: To make 100 ml of the separation buffer, 1 g of PVP was added to 60 ml nuclease free water in a 250 ml glass beaker and allowed to sit at room temperature for 10 minutes, the solution was swirled gently to help PVP to be completely dissolved. Then, 24 g of urea was added. The solution was mixed with a clean stirring bar for about 20 minutes without heating. After urea was completely dissolved, 10 ml of the 10×TBE buffer was added. After one more minute of stirring, nuclease free water was added until the total volume was 100 ml. The separation buffer contained 1% PVP, 1×TBE, pH 8.3 and 4 M urea. This buffer should be good for one month if stored at 2° C. to 8° C. in 10 ml aliquots. Before sample run, the required aliquot of buffer was warmed up to room temperature and filtered through a 5 μm filter. SYBR Green II dye was added at a 1 to 25,000 dilution. About 7.5 ml of this dye-containing buffer was used for each set of 8 injections.

LIF Calibration: To ensure consistent response of LIF detector throughout this study, the LIF detector was calibrated using LIF Calibration Wizard and Performance Test Mix (PN 726022) following the instructions in PA 800 Plus System Maintenance Guide (PN A51964).

Sample Storage: AAV samples and the Sigma Transcript RNA Markers were aliquoted at 5 to 20 μl upon first thawing and stored at −80° C. freezer to avoid multiple freeze-thaw cycles.

Sample Preparation for AAV Genome: Filter tips were used for all steps to minimize unintended nucleic acid degradation. Nucleic acid impurities in AAV samples were digested in a 20 μl reaction that contained 10 μl sample, 7 μl of AAV formulation buffer, 2 μl of 10×DNase I buffer and 1 μl of benzonase that was diluted 10 fold in 1× DNase I buffer (100 mM Tris-HCl, pH 7.5 at 25° C., 25 mM MgCl$_2$, 1 mM CaCl$_2$). The digestion was carried out at 37° C. for 30 minutes and terminated by addition of 2 μl of 50 mM EDTA and 278 μl of AAV formulation buffer. The benzonase and degraded nucleic acid were removed by using an Amicon centrifugal filter unit with 100 KDa cutoff. The filter unit was prewetted by centrifuging 400 μl of AAV formulation buffer through it at 14,000×g for 2 minutes in a microfuge followed by decanting the filtrate and any residual buffer inside the filter. After benzonase treated AAV sample was loaded, the filter was centrifuged at 14,000×g for 2 minutes. The concentrated sample was collected by inverting the filter unit in a clean collection tube and centrifuged at 1,000×g for 2 minutes. AAV formulation buffer was added to the concentrated sample to increase the total volume to 95 AAV capsids were disassembled by adding 5 μl of 20 mg/ml Proteinase K and incubated at 37° C. for 2 hours. The AAV genome released from AAV capsids was purified using QIAquick PCR purification Kit following manufacturer's instructions except the columns were washed twice. The AAV genome sample was eluted from the column using 30 μl of nuclease free water. Ten microliter of the eluted AAV genome sample was heated at 70° C. for 2 minutes, followed by 5 minutes on ice before transferring to a Nano vial and analyzed on a PA 800 Plus instrument. Any deviation from this procedure is described in results section.

Sample Preparation for RNA markers: The Sigma Transcript RNA markers were diluted in nuclease free water to 1 ng/μl, heat-treated and loaded onto the instrument as described above for the AAV genome sample. All solutions were pipetted with filter tips. Each "NF Water" vials were filled with 1.5 ml nuclease free (NF) water. Waste vial was filled with 1 ml NF water. "Sep Buffer" and "TBE Buffer" vials were filled with 1.5 ml of separation buffer containing SYBR Green II dye and 1×TBE, respectively.

Figure 2:
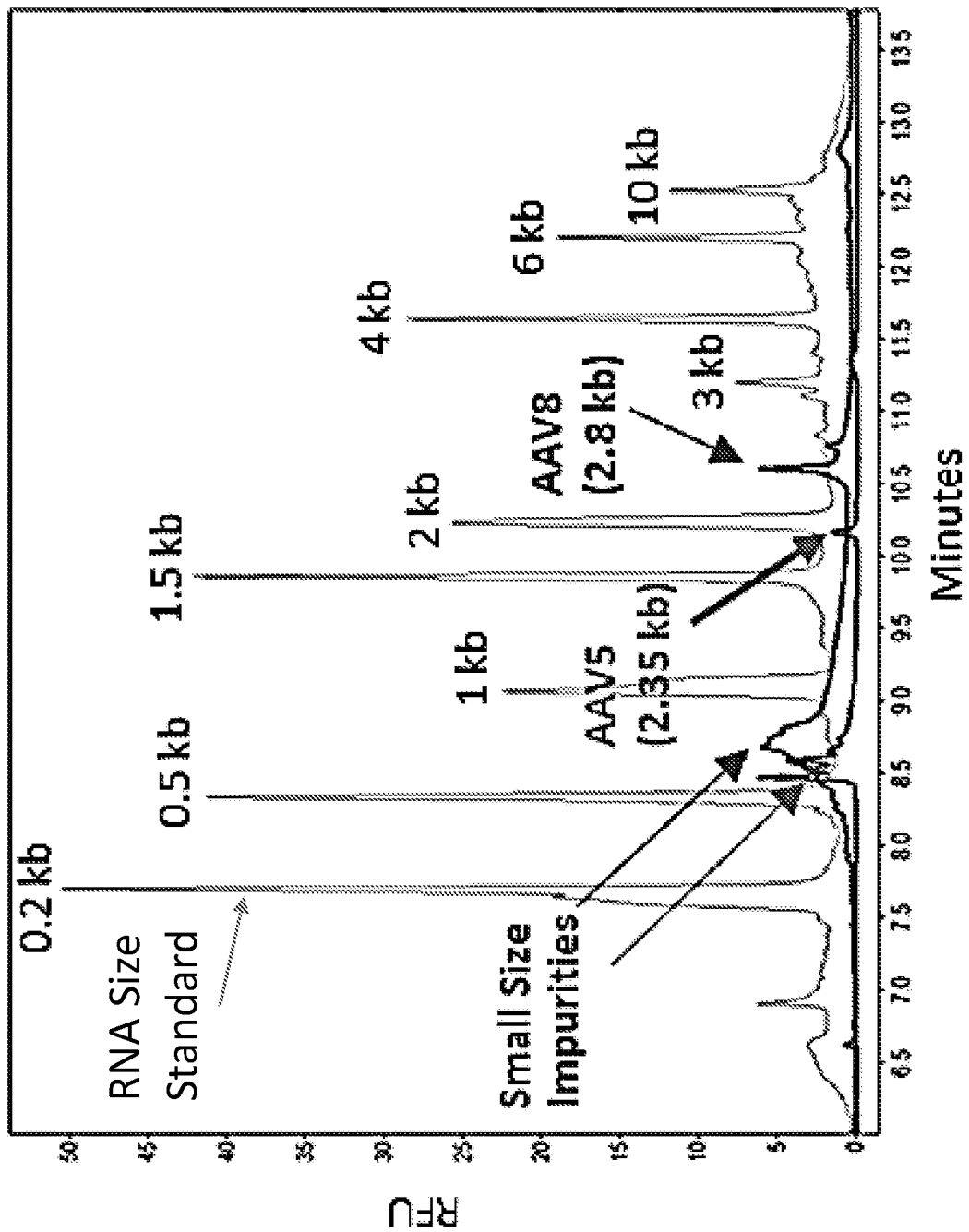
FIG. 2 depicts a genome size analysis of two samples: one of them is an AAV8, the other one is an AAV5.

Analysis of AAV genome of different sizes: Packaged AAV8 of pAV-CMV-GFP (Vigene) and AAV5 of pAAV- CMV-GFP (Signagen) (labelled AAVS (2.35 kb) in FIG. 1), were treated with proteinase K to release the AAV genome. Nucleic acids purified with QIAquick from these samples were analyzed by capillary electrophoresis-Laser Induced Fluorescence on a PA 800 plus Pharmaceutical Analysis System with a sample injection condition of 5 kv for 3 seconds. In FIG. 2, the plot labelled 0.2 kb, 0.5 kb, 1 kb, etc.) was obtained with the RNA size standard. The plot labelled AAV8 (2.8 kb) was obtained with the AAV8 genome sample at 5 μl with a titer of 1.10×1013 GC/ml. The intact genome (2.8 kb) as well as the small size impurities between 0.5 to 1 kb were also detected. In addition, a small peak slightly larger than 2.8 kb was present. The RNA size standard, the AAV8 sample and the AAVS sample were analyzed by CE-LIF separately. The electropherograms from these three individual runs were displayed in an overlay style. This may be the same intact genome but with secondary structure. There is also a shallow peak larger than 10 kb. These is a possibility that this peak is due to a multimeric AAV genome. The AA5 labelled trace was obtained with the AA5 genome sample at 5 μl with a titer of 1×1013 GC/ml. The intact genome (2.35 kb) as well as the small size impurities between 0.5 to 1 kb were detected. The size of short impurities in AAVS samples was smaller than those in AAV8 samples. This may be related to the differences in production processes for making these two samples. For example, different amounts of nucleases may be used in treating the cell lysate. In addition, there may be differences in how the AAV Full capsids were collected at the end of the ultracentrifugation procedure. It is important to note that the RNA size standards migrate slower than the single stranded AAV genome of the same sizes. This is due to differences in base composition in these nucleic acid fragments as well as the differences related to ribose in RNA versus deoxyribose in single stranded DNA.

Figure 3:
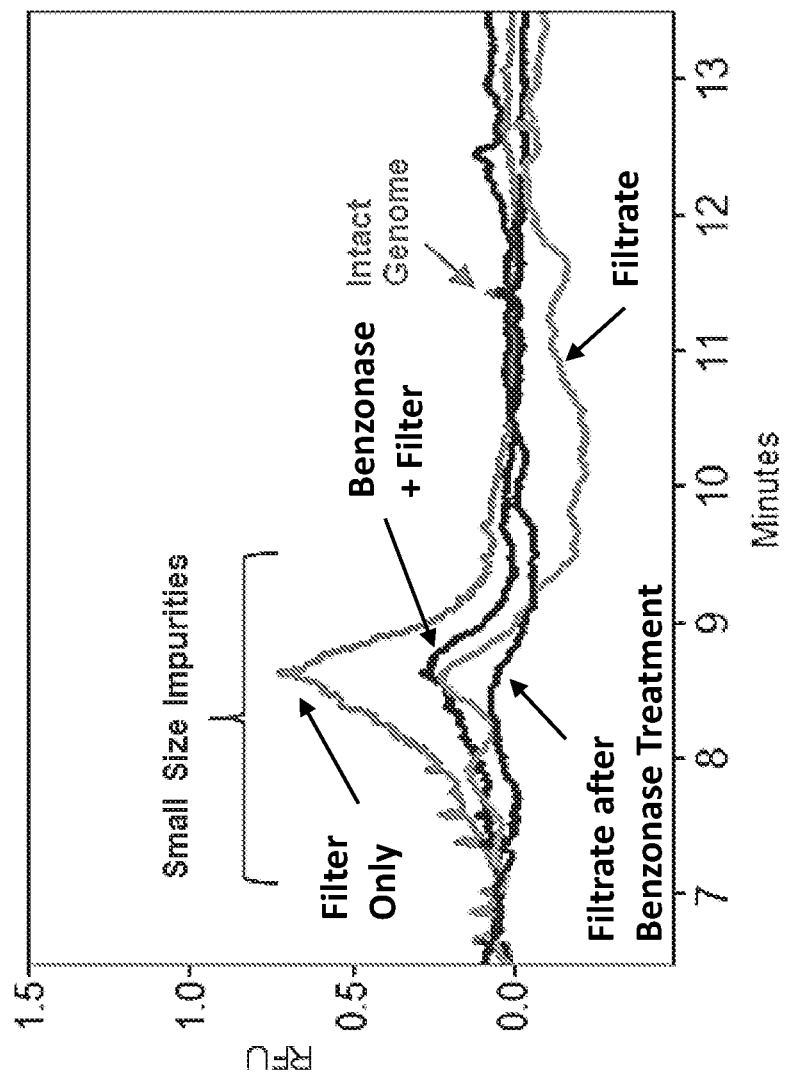
FIG. 3 depicts a comparison of analysis of samples before and after benzonase treatment to remove impurities

Benefit of Benzonase Treatment: Small size impurities were present in AAV samples as shown in FIG. 2. These impurities could be degraded nucleic acids from the host cell and from the plasmid vector that were not well separated from the Full AAV capsids. Benzonase is an unselective endonuclease that attacks and degrades all forms of DNA and RNA (single stranded, double stranded, linear and circular) down to oligonucleotides that are 2-5 bases in length. An Empty AAV8 sample produced as a by-product during the production of a packaged AAV8 containing an intact genome size of 4.5 kb was obtained from Vigene. This Empty AAV8 sample at 10 μl with a titer of 1.06×1013 GC/ml was treated with Benzonase and filtered through an Amicon Ultra-0.5 centrifugal filter unit with MW cut off of 100 KDa to remove benzonase as well as degraded nucleic acid species. The filtrate was also collected. As a control, another Empty sample at 10 μl that was not treated with benzonase was also applied to the Amicon filter. The filtrate was also collected. Since Empty AAV samples often contain a low amount of Full AAV capsids, the Empty samples were treated with Proteinase K after they were collected from the Amicon filter device. Nucleic acids from the two Empty samples (with or without benzonase treatment) and the two filtrate samples were purified and analyzed on PA 800 Plus with sample injection of 5 kv for 3 seconds. Results in FIG. 3 demonstrated that the amount of small size impurities was significantly reduced in the benzonase treated sample than in sample not treated with the enzyme. In addition, a significant amount of small size impurities was present in the filtrate from the Empty AAV sample not treated with benzonase. In contrast, much lower amount of these impurities was present in filtrate from the benzonase treated Empty AAV sample indicating that the benzonase was effective in degrading the small size impurities outside of the capsids. The presence of small size impurities in filtrate from AAV sample not treated with benzonase indicates that the filtering alone also remove some of the small size impurities. As expected, a small amount of intact AAV genome shown by the arrow was detected in the two empty AAV samples regardless of benzonase treatment. However, it was not detected in the two filtrate samples.

Figure 4:
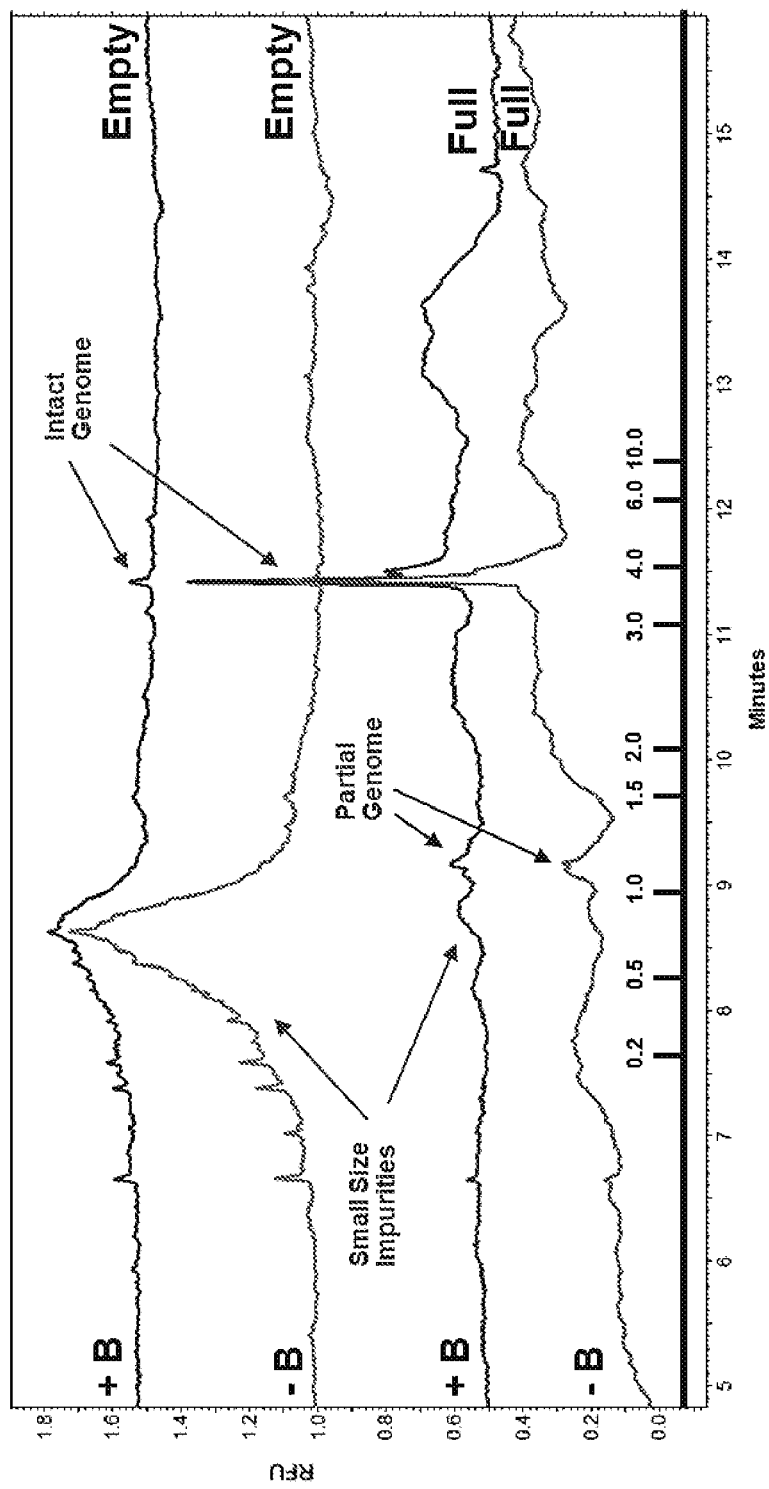
FIG. 4 depicts analyses of full and empty AAV8 samples.

Separation of Partial AAV Genome from the Intact AAV Genome: As shown in FIG. 2, the intact AAV genome and small size impurities were detected in two AAV samples with relatively smaller intact genome sizes: AAV8 (2.8 kb) and AAVS (2.35 kb). No partial genome was detected. An AAV8 sample with a larger intact genome size (4.5 kb) was tested next. In this experiment, both Full and Empty AAV8-4.5 kb samples at 10 μl with a titer of 1.06×1013 GC/ml were treated with benzonase to degrade nucleic acid impurities outside of the capsids. After benzonase digestion, samples were filtered with Amicon filter, treated with protein K before nucleic acid extraction and separation on PA 800 Plus. Samples were injected at 5 kv for 3 seconds. As a control, another pair of Full and Empty AAV8-4.5 kb samples were processed in the same way as described above but without benzonase treatment. Results obtained with these four samples were shown in FIG. 4 where analysis of full and empty AAV8-4.5 kb samples on PA 800 Plus are shown. Samples were treated with (+B) or without (−B) benzonase, passed through Amicon filter followed by proteinase K digestion and nucleic acids extraction and separation on PA 800 Plus. The titer for the Full and empty sample was $1.06 \times 10^{13}$ GC/ml. The vertical bars (labelled 0.2, 0.5, 1.0, 1.5, etc.) represent the migration time positions of RNA size standards with their sizes indicated in kilobases. The peak for the intact genome was present in all 4 samples. However, the peak height was much higher in the two Full samples than in the two Empty samples. The corrected peak areas for the intact genome peak were 10944 and 9656 in Full samples treated with or without benzonase, and 571 and 573 in Empty samples treated with or without benzonase. Therefore, this analysis method has the potential to be used as a method for titer determination upon further development. In addition to the intact genome peak, the two Full samples also had a peak that is slightly larger than 1 kb. This could be the partial genome peak (1.3 kb) without the transgene. Sequencing or restriction fragment analysis will be needed to confirm this hypothesis. The small size impurity peak is minimal in both Full samples indicating that these Full samples were of high purity. As expected, the small size impurity peak in Empty sample without benzonase treatment (second uppermost trace) was significantly higher than in the one treated with the enzyme (uppermost trace). In FIG. 1, the Full AAV 8-4.5 kb samples treated with benzonase and Proteinase K was injected at 5 kv for 10 seconds. The intact genome, partial genome and low amount of small size impurities were detected in a sample extracted from an AAV8 4.5 kb sample. The signal to noise ratio for the partial genome peak was 8.10. The blank control trace labelled "BL" was obtained with nuclease free water that went through the entire process of benzonase and proteinase K treatment as well as the nucleic acid purification using QIAquick PCR purification kit. Good baseline was obtained with this blank control. The RNA size standard in FIG. 1 produces a ladder of RNA with various sizes in kilobases (0.2, 0.5, 1.0, 1.5 and 2.0). The AAV8 sample showing the intact genome, partial genome and small size impurities were analyzed by CE-LIF separately. The electropherograms from these two individual runs were displayed in an overlay style.

Figure 5:
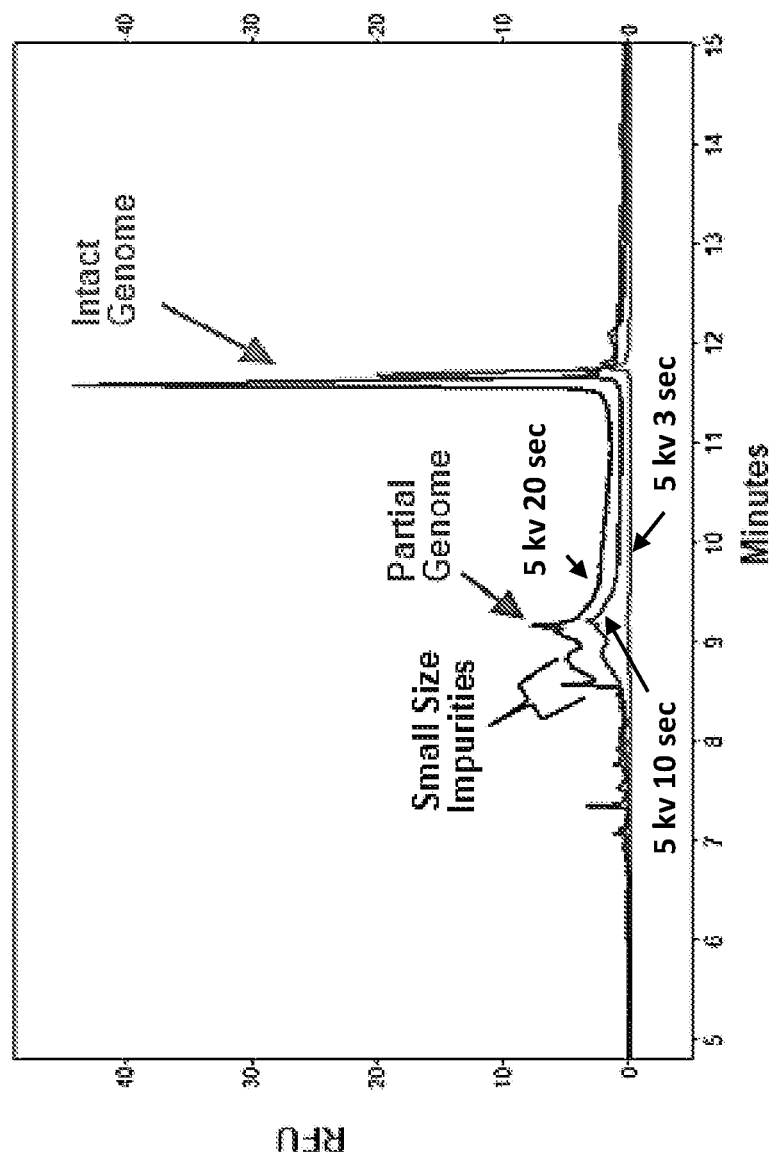
FIG. 5 depicts another analysis of a Full AAV8-4.5 kb sample

Confirmation of Presence of Partial AAV Genome in Sample not treated with Benzonase and Filtering: The partial genome peak observed in FIG. 4 was relatively small. In order to confirm this partial is a true peak, another experiment was performed with the Full AAV8-4.5 kb sample at 10 μl with a titer of $1.06 \times 10^{13}$ GC/ml but without benzonase treatment and filtering. After Proteinase K treatment, the purified nucleic acids were injected on PA 800 Plus for 3 seconds, 10 seconds and 20 seconds, respectively at 5 kv. Results are shown in FIG. 5 which depicts the results of an analysis of Full AAV8-4.5 kb sample with different electrokinetic injection conditions (3 to 20 seconds). Sample was not treated with benzonase and was not filtered. Both the intact genome and the partial genome peaks are present in all injections with increasing signal intensity corresponding to increasing injection time. The small size impurity peaks were also observed, which migrated between 8.5 to 9 minutes, faster than the partial genome peak which was detected around 9.2 min.

Figure 6:
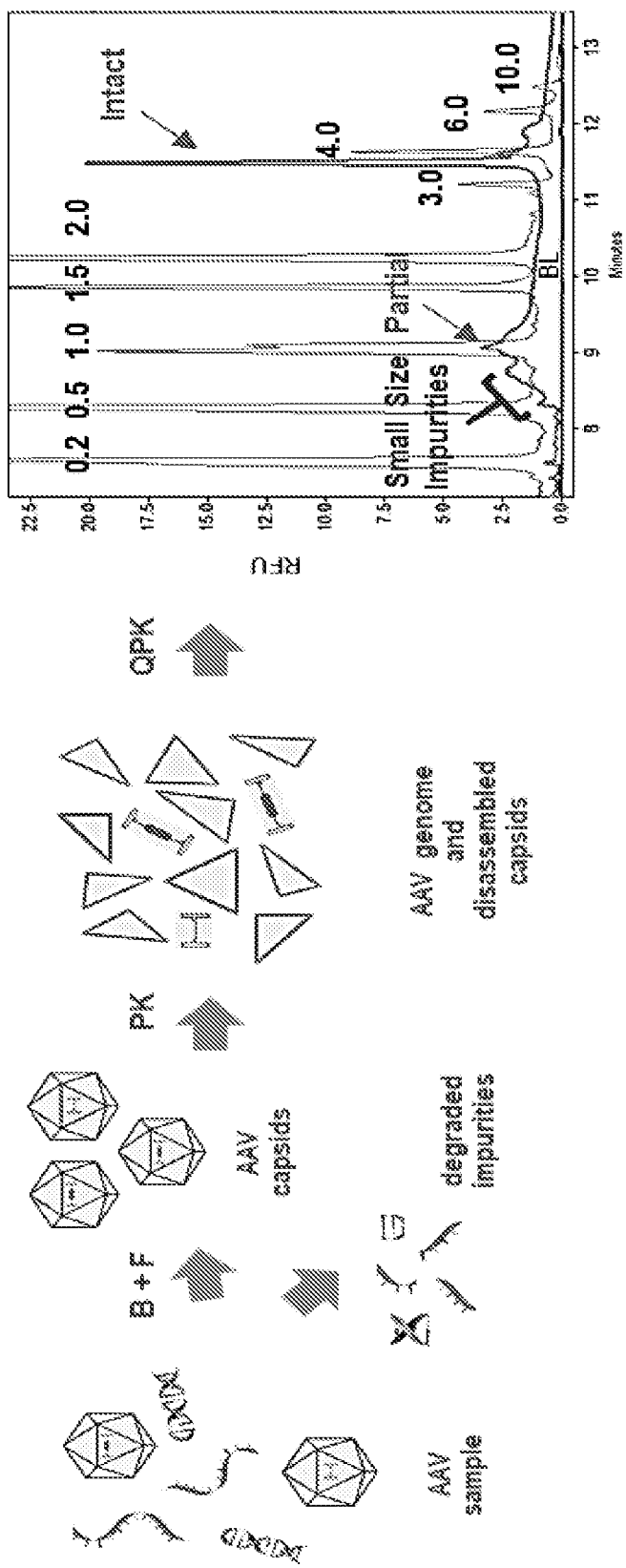
FIG. 6 depicts a Workflow for AAV genome integrity analysis by CE-LIF

Standard Workflow for AAV Genome Integrity by CE-LIF. The overall workflow for AAV genome integrity analysis was established and is shown in FIG. 6. Briefly, the AAV samples were first treated with benzonase to degrade small size impurities outside of capsids. Degraded nucleic acids and lower MW impurities outside of the capsids as well as the benzonase were removed by filtering through Amicon filter with 100 kDa MW cutoff. The purified AAV capsids were treated with Proteinase K to release the viral genome which was purified with QIAquick PCR purification kit (QPK) and analyzed on PA 800 Plus by CE-LIF using a separation gel buffer containing 1% PVP, 1×TBE, 4 M Urea and SYBR Green II and then analyzed produced the results shown in FIG. 1.

Figure 7:
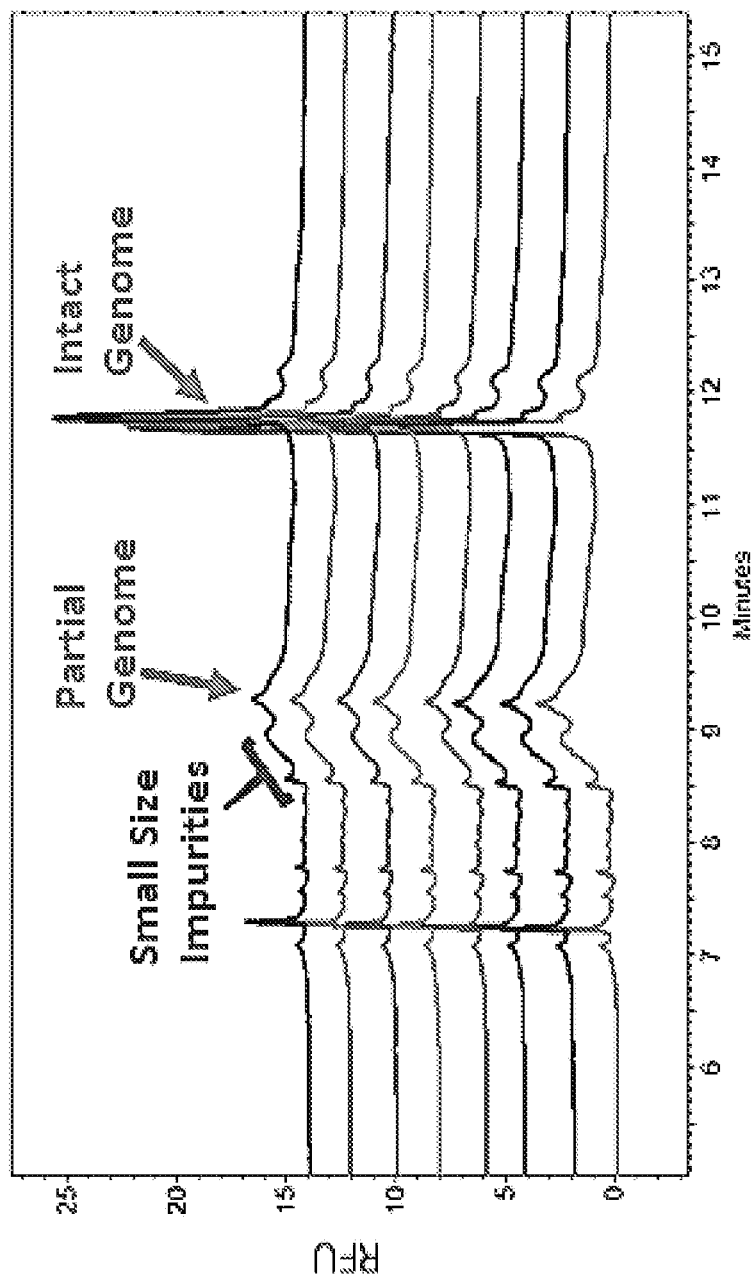
FIG. 7 depicts several analysis of an AAV8 sample.

FIG. 7 demonstrates a repeatability test for sample separation. Specifically, a sample prepared from AAV8-4.5 kb (10 μl with a titer of 1.06×1013 GC/ml) in standard workflow was injected at 5 kv for 10 seconds for 8 times. As demonstrated in FIG. 7, peak patterns in 8 runs were very consistent. The CV for migration time for the partial and intact genome peaks was 0.17% and 0.30% respectively.

Figure 8:
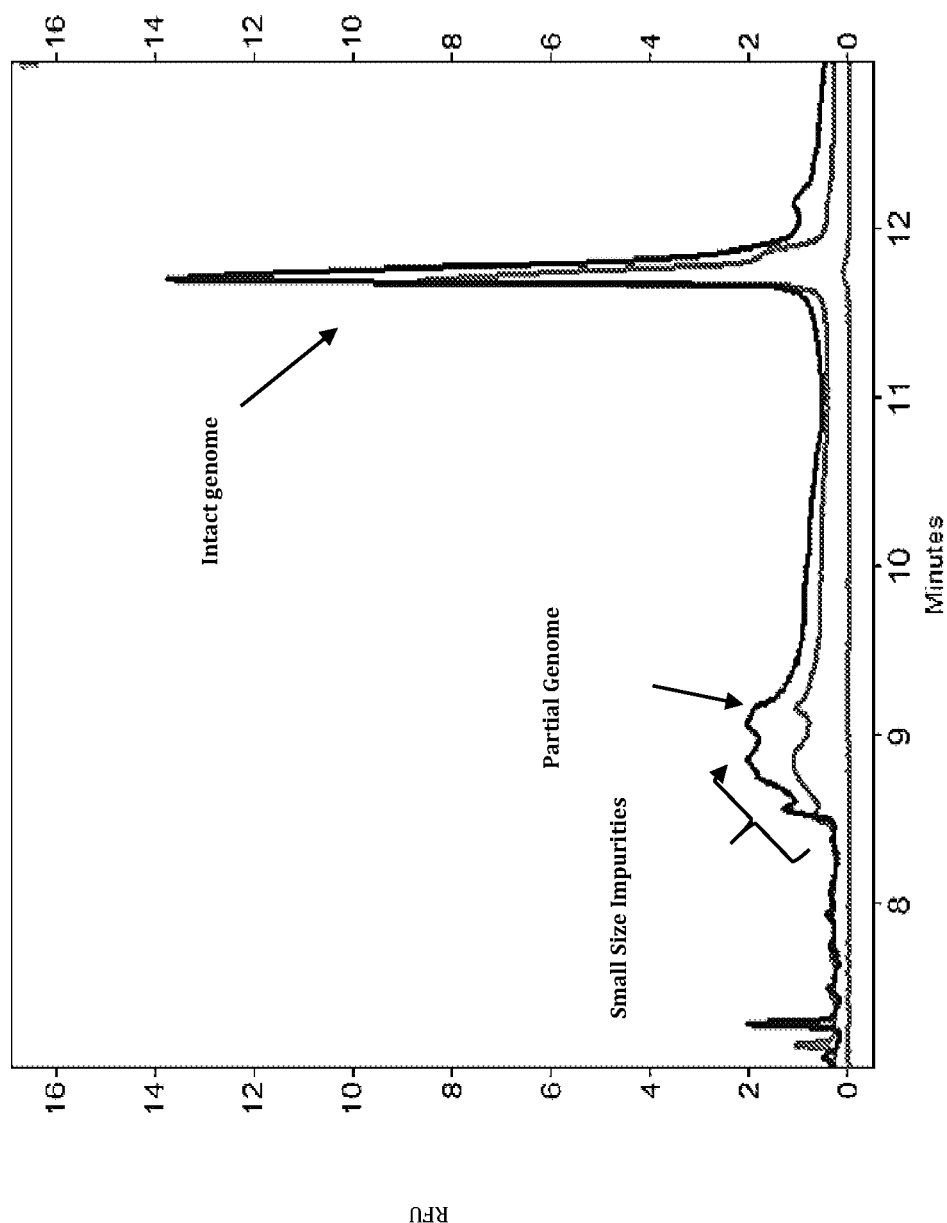
FIG. 8 depicts an AAV genome size purity analysis using a simplified workflow
Figure 9:
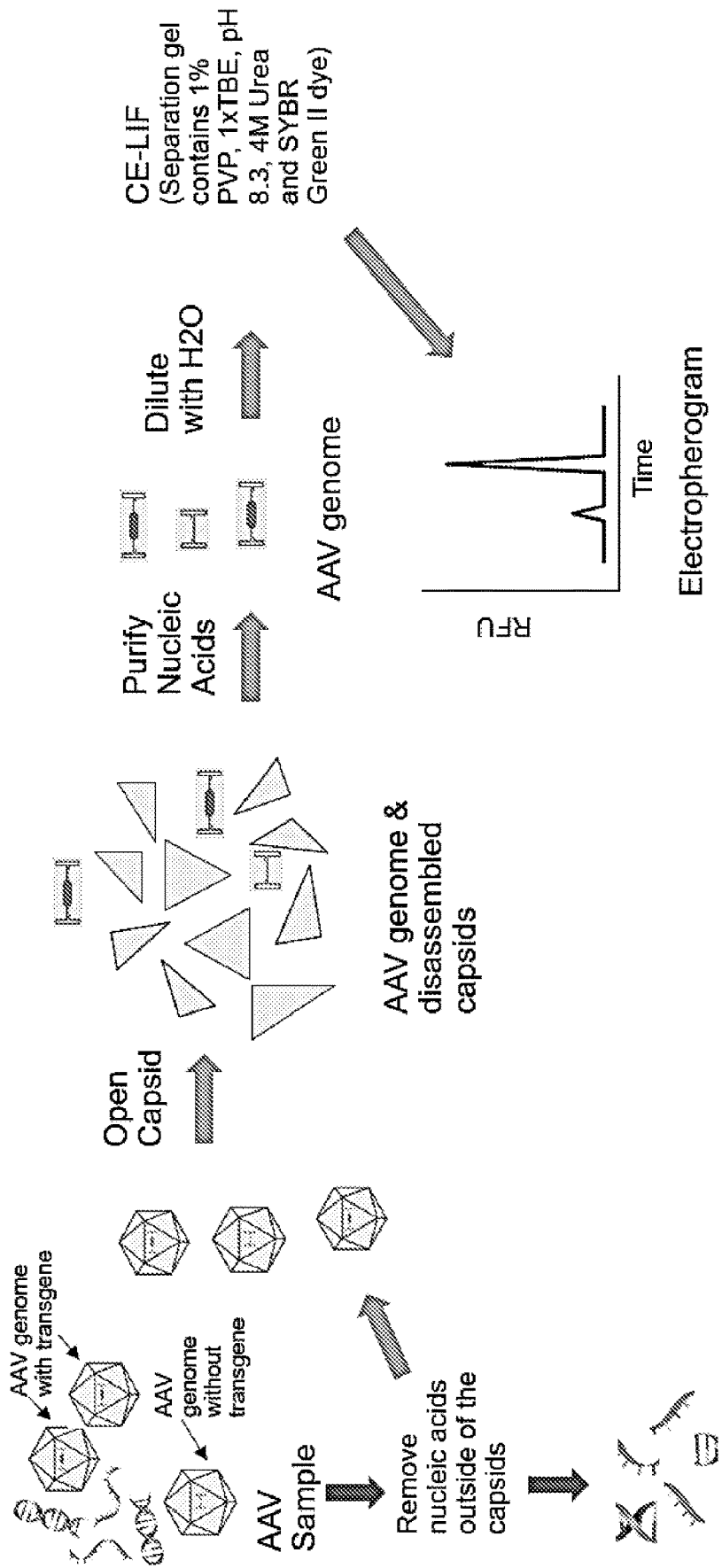
FIG. 9 depicts a workflow for a AAV genome analysis

FIG. 8 demonstrates the results of an AAV Size Purity Test performed utilizing a simplified workflow which shortens the time required to perform the analysis. In this shortened workflow, the AAV8-4.5 kb sample (5 μl with a titer of 1.06×1013 GC/ml) was not treated with benzonase or proteinase K. Instead, it was mixed thoroughly with the binding buffer from the QIAquick PCR purification kit and applied to the Qiagen column. Filtrate was collected from this sample, then, digested with proteinase K. As a control, another 5 μl sample was treated with Proteinase K before Qiagen column. Nucleic acids were purified and separated on PA 800 Plus by CE-LIF. The top most trace was obtained with AAV sample treated with Proteinase K. The middle trace was obtained with sample applied to the Qiagen column without prior proteinase K treatment. The bottom trace was obtained by digesting the filtrate from the Qiagen column with Proteinase K and then applied to another Qiagen column for purification of nucleic acids. FIG. 8 shows that although the signal level obtained from this simplified workflow was lower than samples prepared with Proteinase K, the same peak pattern including the intact genome, the partial genome and small size impurities were well conserved. This shortened procedure requires about 30 minutes to test a sample from sample preparation to obtaining results from a PA 800 Plus. As expected, a very low amount of intact genome was obtained from the filtrate using this shortened procedure, indicating that a very low number of capsids were not opened in the presence of high concentration of Guanidine HCl present in the Qiagen binding buffer. Similar results were also obtained with an AAV2 sample from Signagen. This simplified workflow may be useful for quick in-process quality check during AAV manufacturing process. An alternative workflow is depicted in FIG. 9.

Figure 10:
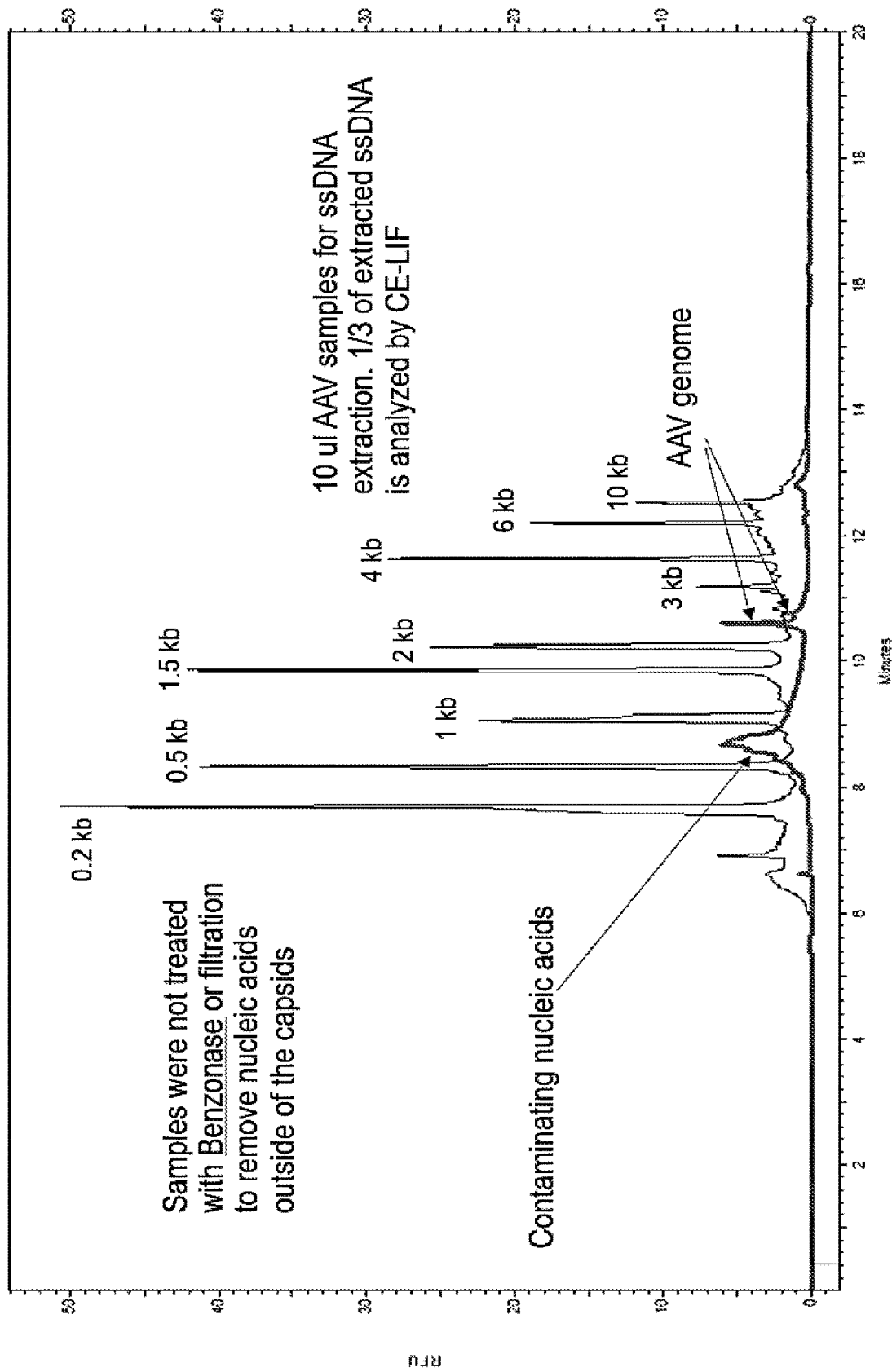
FIG. 10 depicts an AAV8 analysis of a full capsid sample

Now referring to FIG. 10, an analysis of full capsids of an AAV8 sample analyzed with SYBR Green II dye was performed where samples were not treated with Benzonase or filtration to remove nucleic acid containments external to the capsids. As seen, the RNA sizing ladder (labelled 0.2 kb, 0.5 kb, etc.) has been utilized to identify the size of the AAV genome. As is evident, in the lower trace, both a broad peak containing contaminating nucleic acids as well as the desired genome of the AAV are visible.

The ladder is developed by utilizing a series of RNA standards having different known sizes that are analyzed utilizing the procedure set out within the present teachings. In FIG. 10, RNA size standards containing 0.2 kb, 0.5 kb, 1 kb, 1.5 kb, 2 kb, 3 kb, 4 kb, 6 kb and 10 kb lengths. As have been plotted. The unknown sample containing an AAV8 sample with a 2.8 kb SSDNA sample is plotted against the RNA sizing ladder to determine its length.

Figure 11:
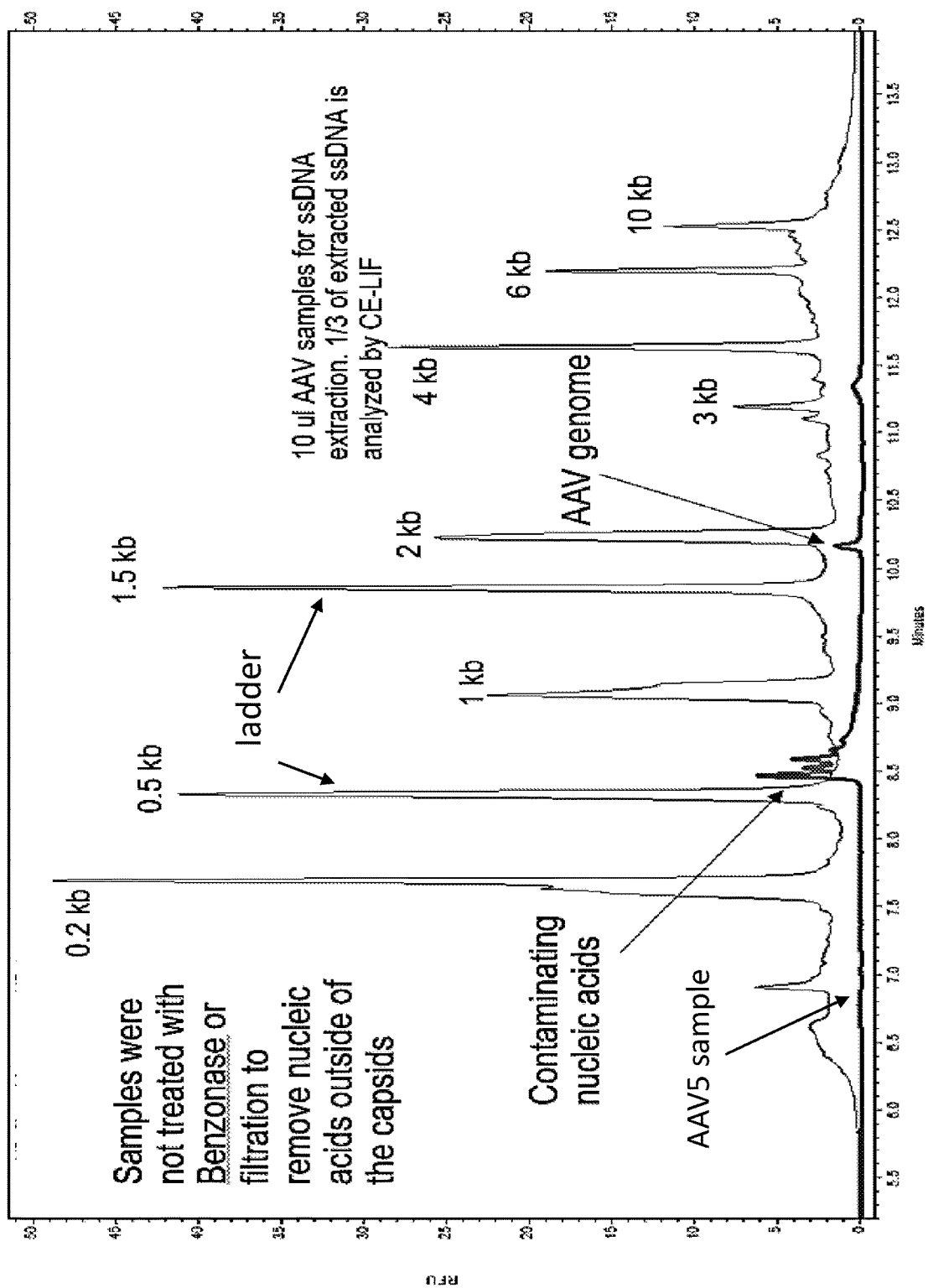
FIG. 11 depicts an AAV5 analysis of a full capsid sample

Now referring to FIG. 11, an analysis of full capsids of an AAV5 sample with SYBR Green II dye being added to the separation gel (1% PVP, 1×TBE and 4 M urea) was performed where samples were not treated with Benzonase or filtration to remove nucleic acid containments external to the capsids. As is evident, in the lower trace, both contaminating nucleic acids as well as the desired genome of the AAV are visible.

Figure 12:
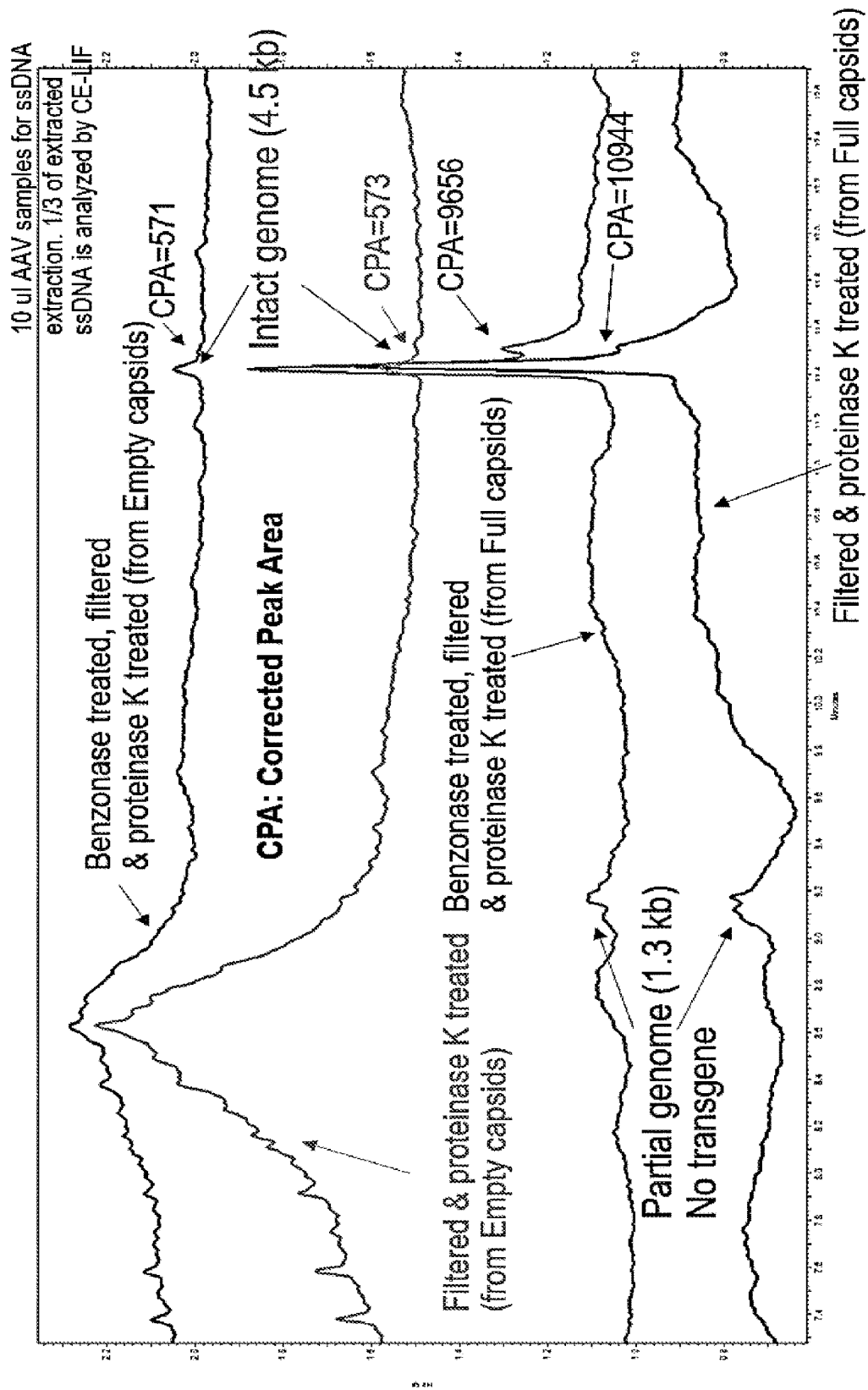
FIG. 12 depicts an AAV8 analysis of a full and empty capsid

Now referring to FIG. 12, a series of 4 different analysis are conducted of full and empty AAV8 with 4.5 kb genome size analyzed suing SGII dye. The two top traces are analyses of empty capsids: one of them (the uppermost trace) was subjected to benzonase treatment; one of them was not (the second uppermost trace); Both were filtered. The two lower traces are analyzes of full capsids: one of them (the second lowest trace) was subjected to benzonase treatment; one of them was not (the lowest trace); Both were filtered. Among the data from the two Empty AAV samples, the amount of the small size impurity was much less in benzonase treated (uppermost trace) than in sample not treated with benzonase (second uppermost trace), indicating Benzonase treatment removed a significant amount of small size impurities. Not much difference between the two Full AAV samples, possibly due to the fact that this Full AAV sample is quite pure, not containing a lot of low MW impurities.

Figure 13:
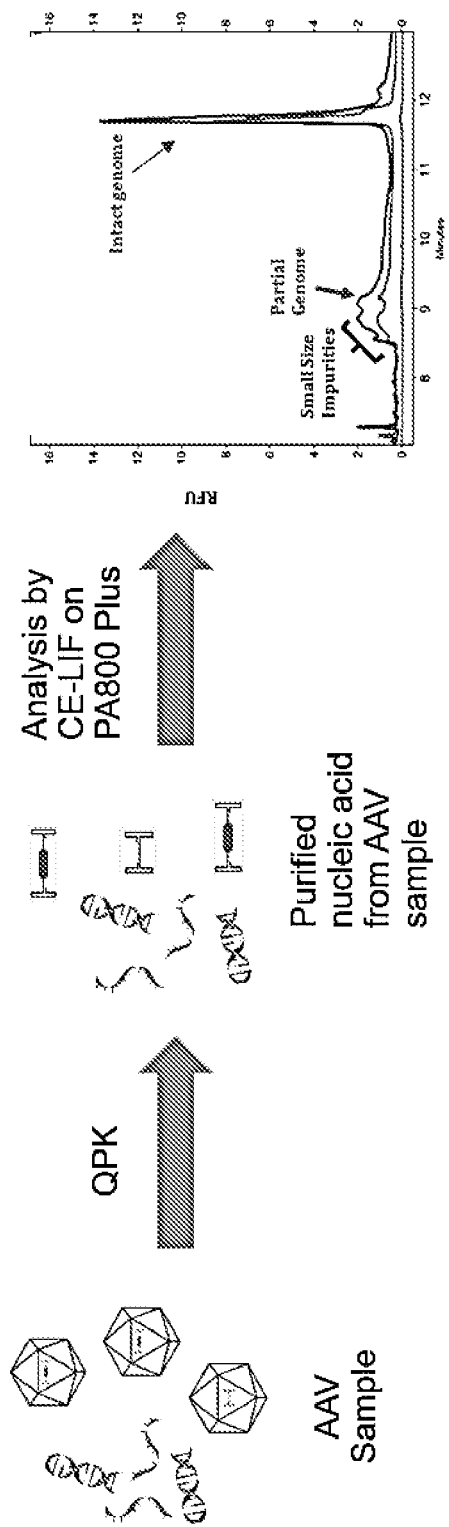
FIG. 13 depicts a workflow for an AAV8 analysis

Now referring to FIG. 13, another workflow describing another embodiment of an analysis of a full and empty AAV8 with a 4.5 kb genome size using SGII dye is shown.

Further, in describing the specific embodiments, the specification may have presented a method and/or process as a particular sequence of steps. However, to the extend that the method or process does not rely on the particular order of steps set forth herein, the method or process should not be limited to the particular sequence as described. As one of ordinary skill in the art would appreciate, other sequences of steps my be possible. There, the particular order of the steps set forth in the specification should not be construed as limitations on the claims. In addition, the claims directed to the method and/or process should not be limited to the performance of the steps in the order written, and one skilled in the art can readily appreciate that the sequences may be varied and still remain within the spirit and scope of the various embodiments.

The invention claimed is:

1. A kit for analyzing an adeno-associated virus comprising:
a standard comprising a plurality of different ssRNA strands, each of the different ssRNA strands having a known and different size;
a positive control containing an intact AAV genome, a partial AAV genome and small size impurities; and
a separation matrix adapted for use with capillary electrophoresis.

2. The kit of claim 1 further comprising enzymes to digest nucleic acids.

3. The kit of claim 2 wherein the enzymes comprises benzonase.

4. The kit of claim 1 further comprising an enzyme that releases nucleic acid from an adeno-associated virus.

5. The kit of claim 4 wherein said enzyme is Proteinase K.

6. The kit of claim 1 further comprising materials adapted to perform a PCR purification.

7. A method for analyzing a genome of an adeno-associated virus in a sample comprising:
creating a standard comprising a number of different nucleic acid strands, each of the different nucleic acid strands having a known size, wherein the nucleic acid strands are ssRNA;
separating each of the different nucleic acid strands in the standard by measuring each of the nucleic acid strands having a known size by utilizing a capillary electrophoresis-laser induced fluorescence (CE-LIF) device and measuring the separated nucleic acid strands as intensity peaks that are a function of migration time using a detector of the CE-LIF;
creating a purified sample by subjecting said sample to purification to remove nucleic acid impurities;
releasing nucleic acid material from the adeno-associated virus in the purified sample by use of an enzyme;
separating and analyzing the released nucleic acid material from the purified sample utilizing the CE-LIF device and measuring the separated nucleic acid strands as one or more intensity peaks that are a function of migration time using a detector of the CE-LIF; and
identifying the size of the nucleic acid material in the sample by comparing the intensities and migration times of the released nucleic acid material from the purified sample and the intensities and migration times of the nucleic acid strands of the standard.

8. The method of claim 7 wherein the nucleic acid strands of the standard comprise RNA.

9. The method of claim 7 wherein purification of the samples is performed by digesting the sample with benzonase and isolating the adeno-associated virus by filtration.

10. The method of claim 7 wherein the enzyme is Proteinase K.

11. The method of claim 7 wherein the released nucleic acid material is subjected to purification using a PCR purification kit.

12. The method of claim 7 wherein the nucleic acid material comprises DNA.

* * * * *